United States Patent
Lin et al.

(10) Patent No.: US 12,217,134 B2
(45) Date of Patent: Feb. 4, 2025

(54) QUANTUM CHARGE-COUPLED DEVICE

(71) Applicant: National Taiwan University, Taipei (TW)

(72) Inventors: Guin-Dar Lin, Taipei (TW); Wen-Han Png, Taipei (TW)

(73) Assignee: National Taiwan University, Taipei (TW)

( * ) Notice: Subject to any disclaimer, the term of this patent is extended or adjusted under 35 U.S.C. 154(b) by 288 days.

(21) Appl. No.: 17/993,887

(22) Filed: Nov. 24, 2022

(65) Prior Publication Data
US 2023/0169384 A1 Jun. 1, 2023

Related U.S. Application Data

(60) Provisional application No. 63/283,548, filed on Nov. 29, 2021.

(30) Foreign Application Priority Data

Sep. 6, 2022 (TW) .................................. 111133656

(51) Int. Cl.
*G06N 10/40* (2022.01)

(52) U.S. Cl.
CPC ..................................... *G06N 10/40* (2022.01)

(58) Field of Classification Search
CPC ........... G06E 1/00; G06N 10/00; B82Y 10/00
See application file for complete search history.

(56) References Cited

U.S. PATENT DOCUMENTS

| | | | |
|---|---|---|---|
| 10,510,523 B2 | 12/2019 | Kim et al. | |
| 11,037,776 B1 | 6/2021 | Makotyn et al. | |
| 2015/0097115 A1* | 4/2015 | Schwartz | H01J 49/4215 250/283 |
| 2019/0378033 A1* | 12/2019 | Figgatt | G06N 10/40 |
| 2019/0392336 A1 | 12/2019 | Leipold et al. | |

(Continued)

FOREIGN PATENT DOCUMENTS

| | | |
|---|---|---|
| CN | 113420882 | 9/2021 |
| CN | 113592091 | 11/2021 |
| TW | I713194 | 12/2020 |

OTHER PUBLICATIONS

Wen-Han Png, "Two-qubit entangling gate between a stationary and a flying ion qubits", Department of Physics College of Science National Taiwan University Master Thesis, Jul. 2021, pp. 1-82.

(Continued)

*Primary Examiner* — Quan Tra
(74) *Attorney, Agent, or Firm* — JCIPRNET

(57) ABSTRACT

A quantum charge-coupled device including a first ion, a second ion, a fixed ion trap, an adjustable ion trap, and an excitation light source is provided. The fixed ion trap is configured to stationarily trap the first ion. The adjustable ion trap works as an ion rail disposed beside the fixed ion trap, wherein the ion rail is configured to make the second ion move at a constant velocity along the ion rail. The excitation light source is configured to irradiate an incident light beam. The incident light beam includes a series of light pulses and covers the first ion and the second ion when a distance between them becomes less than or equal to a proximity range, such that a quantum entangled state is directly built between the first ion and the second ion in uniform motion.

11 Claims, 5 Drawing Sheets

(56) References Cited

U.S. PATENT DOCUMENTS

| | | |
|---|---|---|
| 2020/0033511 A1 | 1/2020 | Kim et al. |
| 2020/0369517 A1 | 11/2020 | Nam et al. |
| 2020/0372389 A1 | 11/2020 | Nam et al. |
| 2021/0133616 A1 | 5/2021 | Debnath |
| 2023/0260777 A1* | 8/2023 | Wang ........................ G21K 1/00 |

OTHER PUBLICATIONS

Rainer Blatt et al., "Entangled states of trapped atomic ions", Nature, Jun. 19, 2008, pp. 1008-1015, vol. 453.
"Office Action of Taiwan Counterpart Application", issued on Jan. 19, 2024, p. 1-p. 4.

* cited by examiner

QUANTUM CHARGE-COUPLED DEVICE

CROSS-REFERENCE TO RELATED APPLICATION

This application claims the priority benefit of U.S. provisional application Ser. No. 63/283,548, filed on Nov. 29, 2021, and Taiwan application serial no. 111133656, filed on Sep. 6, 2022. The entirety of each of the above-mentioned patent applications is hereby incorporated by reference herein and made a part of this specification.

BACKGROUND

Technical Field

The disclosure relates to a quantum charge-coupled device for quantum information processing with trapped ions, and more particularly, to a scalable ion trap device consisting of stationarily trapped ion arrays and travelling ions, and to a non-stop quantum entangling gate scheme between them.

Description of Related Art

Recent development of quantum technology has driven a new wave of technological and industrial revolution and has become a strategic mission of countries around the world. Up to present, great countries and economies including the United States, European Union, China, India, and many others have invested a huge number of resources in the race of quantum technology research such as quantum communications, quantum metrology and sensing, quantum simulation, and quantum computing. Among all the implementation hardware platforms, the ion trap system has shown its promise for its long-lived quantum state coherence and unbeatable quantum gate fidelity, and therefore become one of the most leading platforms in the development of a general-purpose quantum computer.

To scale up an ion trap platform is still very challenging. Ion shuttling on a quantum charge-coupled device provides a solution and has become the current mainstream technology used by major companies such as IonQ, Quantinuum, and Universal Quantum. The key concept of the quantum charge-coupled device is the flexibility to transport ions so that they can interact with any other ion qubits in various regions to accomplish parallel quantum computing tasks with arbitrary inter-qubit connectivity. Since the realization of a two-qubit quantum logic gate still requires both ions to be in a relatively stationary potential energy well, to make this scheme of ion shuttling work must involve ion array separation, ion acceleration, turning, deceleration, remerging, and re-cooling. It can be expected that huge time and energy costs are wasted in re-configuring and re-cooling the ions, which lacks efficiency and creates a bottleneck in computing capability and practical scalability.

SUMMARY

The disclosure provides an alternative quantum charge-coupled device, which may effectively reduce the heat generation caused by the acceleration and deceleration required for transporting ions in the process of implementing a quantum entangling logic gate.

An embodiment of the disclosure provides a quantum charge-coupled device, which includes a first ion, a second ion, a fixed ion trap, an adjustable ion trap, and an excitation light source. The fixed ion trap is configured to stationarily trap the first ion. The adjustable ion trap works as an ion rail disposed beside the fixed ion trap, and is configured to make the second ion move at a constant velocity along the ion rail. The excitation light source is configured to irradiate an incident light beam, which includes a series of light pulses and covers the first ion and the second ion when a distance between them becomes less than or equal to a proximity range, such that a quantum entangled state is directly built between the first ion and the second ion in uniform motion.

Based on the above, in the quantum charge-coupled device according to an embodiment of the disclosure, since the second ion is arranged to move at a constant velocity along the ion rail formed by the adjustable ion trap, this design eliminates the need of a large number of steps for controlling and cooling the ions, thereby saving a significant amount of operating power and time, and reducing the system complexity. Furthermore, this architecture can be easily extended to a large-scale quantum computing platform.

DESCRIPTION OF THE EMBODIMENTS

Figure 1:
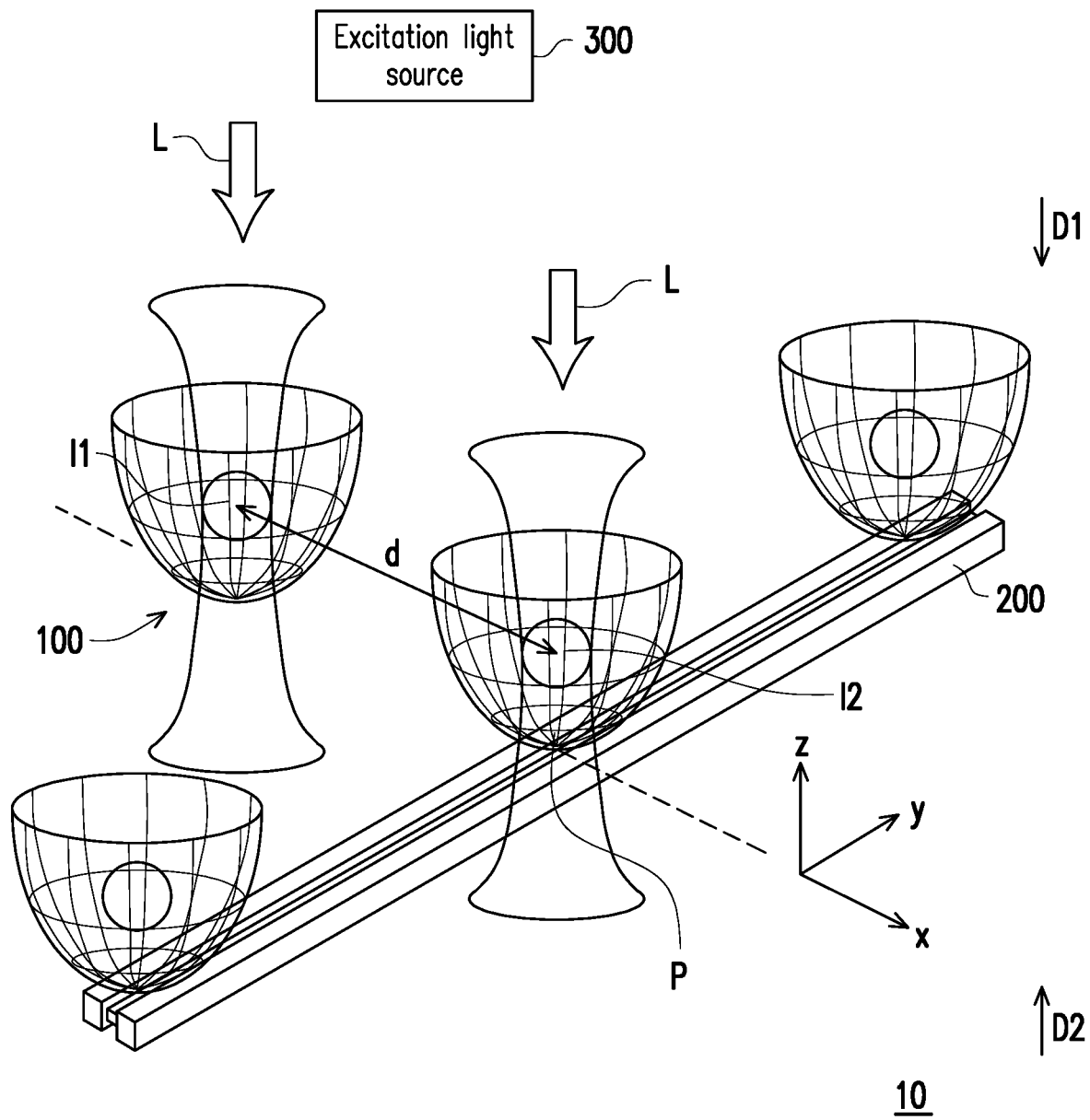
FIG. 1 is a schematic diagram of a quantum charge-coupled device according to a first embodiment of the disclosure.

FIG. 1 is a schematic diagram of a quantum charge-coupled device according to a first embodiment of the disclosure. Referring to FIG. 1, an embodiment of the disclosure provides a quantum charge-coupled device 10, which includes a first ion I1, a second ion I2, a fixed ion trap 100, an adjustable ion trap 200, and an excitation light source 300.

In the embodiment, the fixed ion trap 100 is configured to stationarily trap the first ion I1. The fixed ion trap 100 is of about a few megahertz (MHz), e.g., 5 MHz, in trapping frequency, and can be carried out by, for example, a Paul trap, a micro-fabricated Paul trap (Microtrap), a Micro-Penning trap, or other single atom/ion trapping mechanisms.

In the embodiment, the adjustable ion trap 200 is a linear Paul trap with segmental side electrode control forming a one-dimensional rail for ion transport. Specifically, the adjustable ion trap 200 works as an ion rail disposed beside the fixed ion trap 100, and is configured to provide a local confining trap of about a few megahertz (MHz), e.g., 5 MHz, in trapping frequency by applying voltages of the side electrodes. The position of the second ion I2 on the adjustable ion trap 200 is seen at the lowest potential energy position of the side electrode voltage configuration, and is made in a uniform motion by tuning the configuration.

In the embodiment, the excitation light source 300 is configured to irradiate an incident light beam L, wherein the incident light beam L includes a series of light pulses and covers the first ion I1 and the second ion I2 when a distance between them becomes less than or equal to a proximity range such that a quantum entangled state is directly built between the first ion I1 and the second ion I2 in uniform motion. The series of light pulses may include Raman light pulses formed by at least two or three laser beams of different tones, but the disclosure is not limited thereto. When the phase-space trajectory of the coupled motional normal modes between the first ion I1 and the second ion I2 forms a closed curve, a logic gate for quantum entanglement can be realized between the first ion I1 and the second ion I2. The remaining details of the quantum entangled state formed between the first ion I1 and the second ion I2 are not described here.

Figure 4:
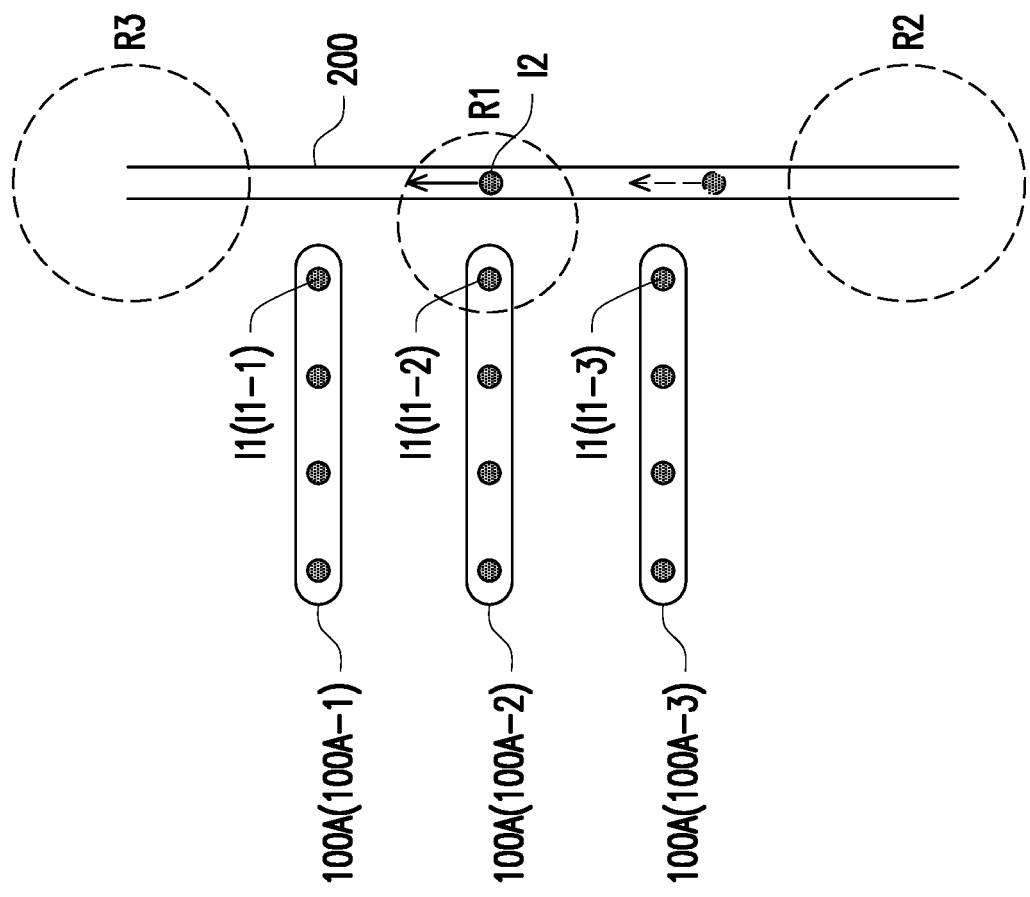
FIG. 4 is a schematic diagram of a quantum charge-coupled device according to a second embodiment of the disclosure.

In the embodiment, the aforementioned proximity range is, for example, a range that is approximately larger than a distance d between the first ion I1 and a position P shown in FIG. 1, or a proximity range R1 shown in FIG. 4. In an embodiment, the proximity range is in the range of around 10 micrometers (μm) to tens of micrometers, e.g., within the range of 20 micrometers.

In the embodiment, the incident light beam L is irradiated toward the position P of the adjustable ion trap 200 when the second ion I2 is passing by the first ion I1. The incident light beam L is irradiated to the first ion I1 and the position P from a first direction D1 or from a second direction D2. The first direction D1 may be a direction (e.g., a z-axial direction in FIG. 1) perpendicular to the direction of the connection line between the first ion I1 and the position P (e.g., an x-axial direction in FIG. 1) and the moving direction of the second ion I2 (e.g., a y-axial direction in FIG. 1), and the first direction D1 is opposite to the second direction D2. Incidentally, for the convenience of illustrating that the incident light beam L covers both the first ion I1 and the second ion I2, FIG. 1 shows two separate light beams L, but the incident light beam L may be one light beam.

Figure 2:
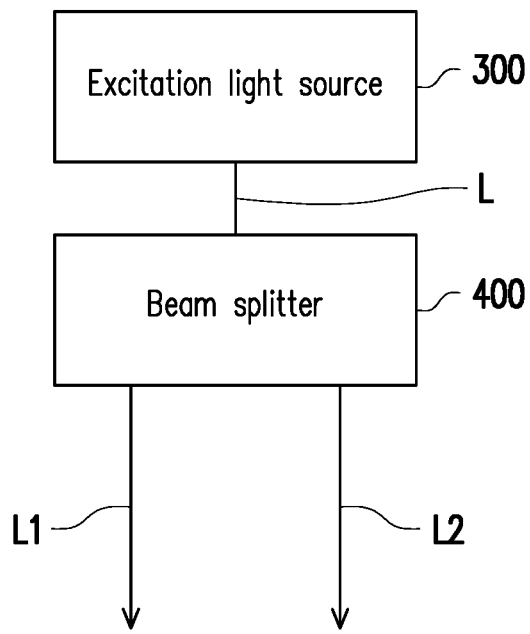
FIG. 2 is a schematic diagram of another excitation light source in FIG. 1.

FIG. 2 is another schematic diagram of an excitation light source in FIG. 1. Please refer to FIGS. 1 and 2 simultaneously. In another embodiment, the quantum charge-coupled device 10 further includes a beam splitter 400. The beam splitter 400 is disposed between the excitation light source 300 and the fixed ion trap 100 or disposed between the excitation light source 300 and the adjustable ion trap 200. The beam splitter 400 divides the incident light beam L into a first incident light beam L1 and a second incident light beam L2, wherein the first incident light beam L1 includes a series of light pulses and the second incident light beam L2 includes a series of light pulses. The first incident light beam L1 is irradiated toward the first ion I1, and the second incident light beam L2 is irradiated toward the position P of the adjustable ion trap 200 that is closest to the first ion I1.

Figure 3:
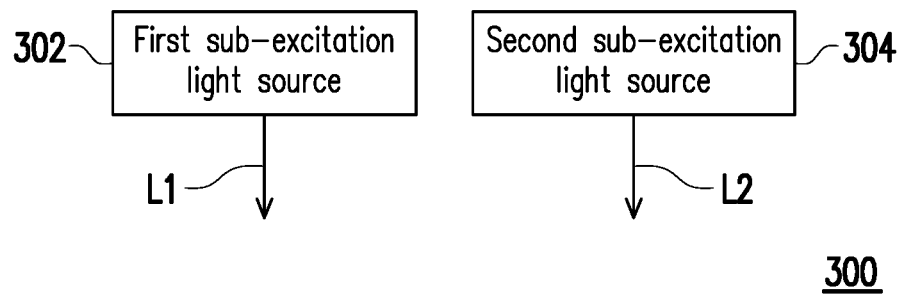
FIG. 3 is a schematic diagram of yet another excitation light source in FIG. 1.

FIG. 3 is a schematic diagram of yet another excitation light source in FIG. 1. Referring to FIG. 3, in yet another embodiment, the excitation light source 300 of the quantum charge-coupled device 10 may include a first sub-excitation light source 302 and a second sub-excitation light source 304. The first sub-excitation light source 302 is configured to emit the first incident light beam L1 toward the first ion I1. The second sub-excitation light source 304 is configured to emit the second incident light beam L2 toward the position P of the adjustable ion trap 200 that is closest to the first ion I1. The first incident light beam L1 and the incident light beam L2 need to be phase-locked.

In addition, in still yet another embodiment, the excitation light source 300 may be a resonant short-pulsed laser. When the resonant short-pulsed laser is chosen to be used as the excitation light source 300, the operation of the entangled logic gates may be sped up using the standard pulsed force gate protocols, which are not described here.

In the embodiment, the quantum charge-coupled device 10 further includes a controller (not shown). The controller is electrically connected with the adjustable ion trap 200 and the excitation light source 300. Moreover, the excitation light source 300 is controlled by the controller to irradiate the incident light beam L when the distance between the first ion I1 and the second ion I2 becomes less than or equal to the proximity range.

The aforementioned controller includes, for example, a central processing unit (CPU), a microprocessor, a digital signal processor (DSP), a programmable controller, a programmable logic device (PLD), or other similar devices, or a combination of the said devices, which are not particularly limited by the disclosure. Further, in an embodiment, each of the functions performed by the controller may be implemented as a plurality of program codes. These program codes will be stored in a memory, so that these program codes may be executed by the controller. Alternatively, in an embodiment, each of the functions performed by the controller may be implemented as one or more circuits. The disclosure is not intended to limit whether each of the functions performed by the controller is implemented by ways of software or hardware.

Based on the above, in the quantum charge-coupled device 10 of an embodiment of the disclosure, the second ion I2 is arranged to move at a constant velocity along the ion rail formed by the adjustable ion trap 200. When the distance between the first ion I1 and the second ion I2 is less than or equal to the proximity range, the incident light beam L is irradiated on the first ion I1 and the second ion I2 such that a quantum entangled state is directly built between the first ion I1 and the second ion I2 in uniform motion. That is, during the process of the second ion I2 approaching the first ion I1, the adjustable ion trap 200 keeps the second ion I2 moving at a constant velocity, and does not need to move the second ion I2 specifically with acceleration or deceleration. Therefore, this design eliminates a large number of steps for controlling and cooling the second ion I2, thereby saving a significant amount of operating power and reducing the system complexity. Furthermore, this architecture can be easily extended to a large-scale quantum computing platform.

FIG. 4 is a schematic diagram of a quantum charge-coupled device according to a second embodiment of the disclosure. FIG. 4 shows that a region R2 where the second ion I2 can be cooled and initialized, the proximity range R1 where the first ion I1 and the second one I2 are irradiated and interact, and a region R3 where the second ion I2 can be reset and recycled.

Referring to FIG. 4, a quantum charge-coupled device 10A of FIG. 4 is substantially similar to the quantum charge-coupled device 10 of FIG. 1, and the main differences are as follows. In the embodiment, the first ion I1 may be generalized to multiple ions I1-1, I1-2, and I1-3, and a fixed ion trap 100A includes multiple sub-fixed ion traps 100A-1, 100A-2, and 100A-3. The sub-fixed ion traps 100A-1, 100A-2, and 100A-3 stationarily trap the sub-ions I1-1, I1-2, and I1-3, respectively. When the distance between each of the sub-ions I1-1, I1-2, and I1-3 and the second ion I2 is less than or equal to the proximity range R1, the incident light beam L is irradiated on each of the sub-ions I1-1, I1-2, and I1-3 and the second ion I2, enabling quantum logic operations to be realized between each of the sub-ions I1-1, I1-2, and I1-3 and the second ion I2.

In the embodiment, the sub-fixed ion traps 100A-1, 100A-2, and 100A-3 are linear ion traps or ion trap arrays, and the adjustable ion trap 200 is a linear rail. The advantages of the quantum charge-coupled device 10A are similar to the advantages of the quantum charge-coupled device 10 in FIG. 1, so details are not described herein again.

Figure 5:
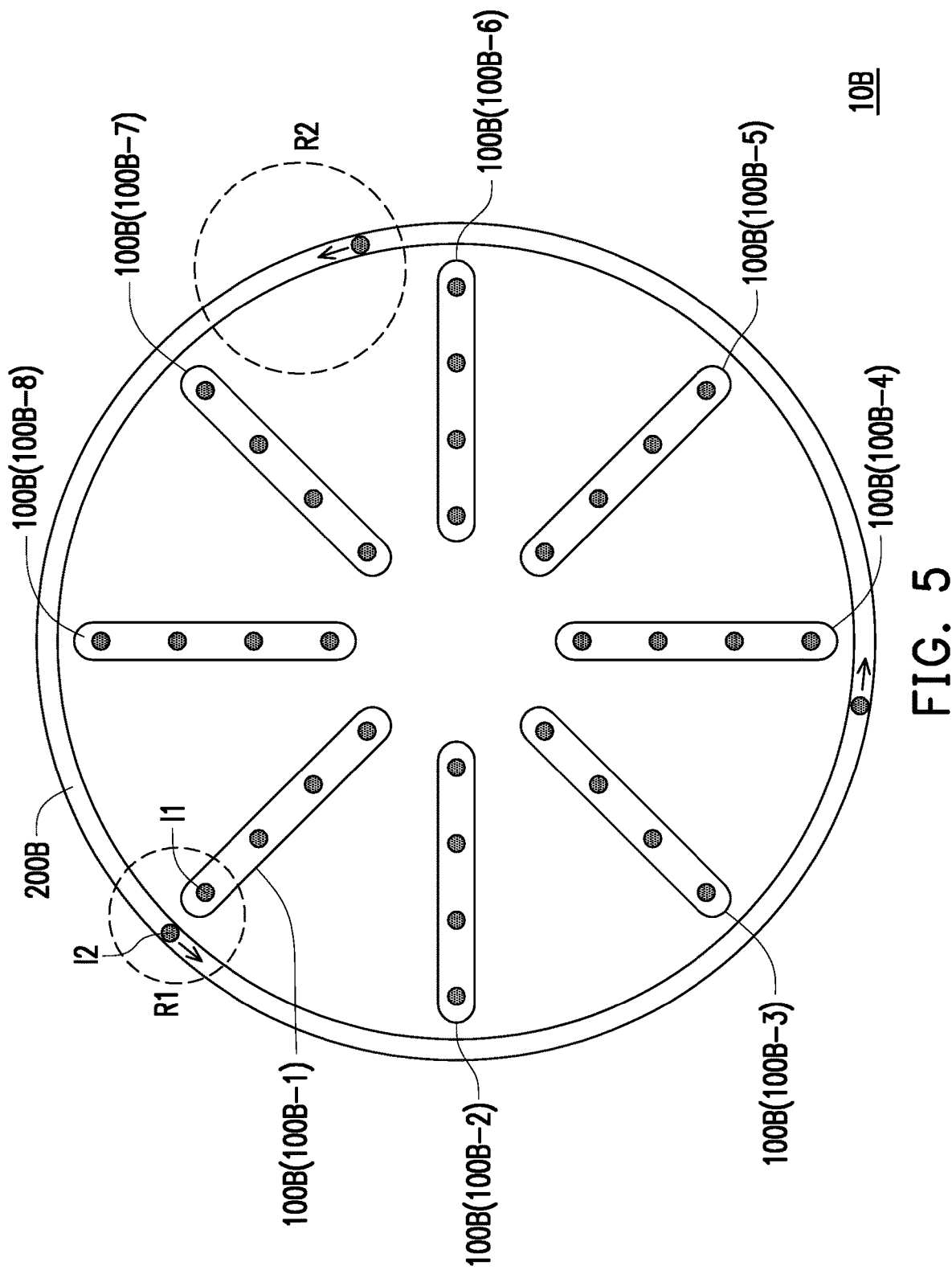
FIG. 5 is a schematic diagram of a quantum charge-coupled device according to a third embodiment of the disclosure.

FIG. 5 is a schematic diagram of a quantum charge-coupled device according to a third embodiment of the disclosure. Referring to FIG. 5, a quantum charge-coupled device 10B of FIG. 5 is substantially similar to the quantum charge-coupled device 10A of FIG. 4, and the main differences are as follows. In the embodiment, sub-fixed ion traps 100B-1, 100B-2, 100B-3, 100B-4, 100B-5, 100B-6, 100B-7, and 100B-8 of a fixed ion trap 100B are linear ion traps or ion trap arrays, and an adjustable ion trap 200B is a large circular rail. This design does not need to reverse the moving direction of the second ion I2. Moreover, the curvature of the large circular rail is small such that there is not too significant non-inertial motion, which may be locally regarded as a constant velocity. The advantages of the quantum charge-coupled device 10B are similar to the advantages of the quantum charge-coupled device 10A in FIG. 4, so details are not described herein again.

Figure 6:
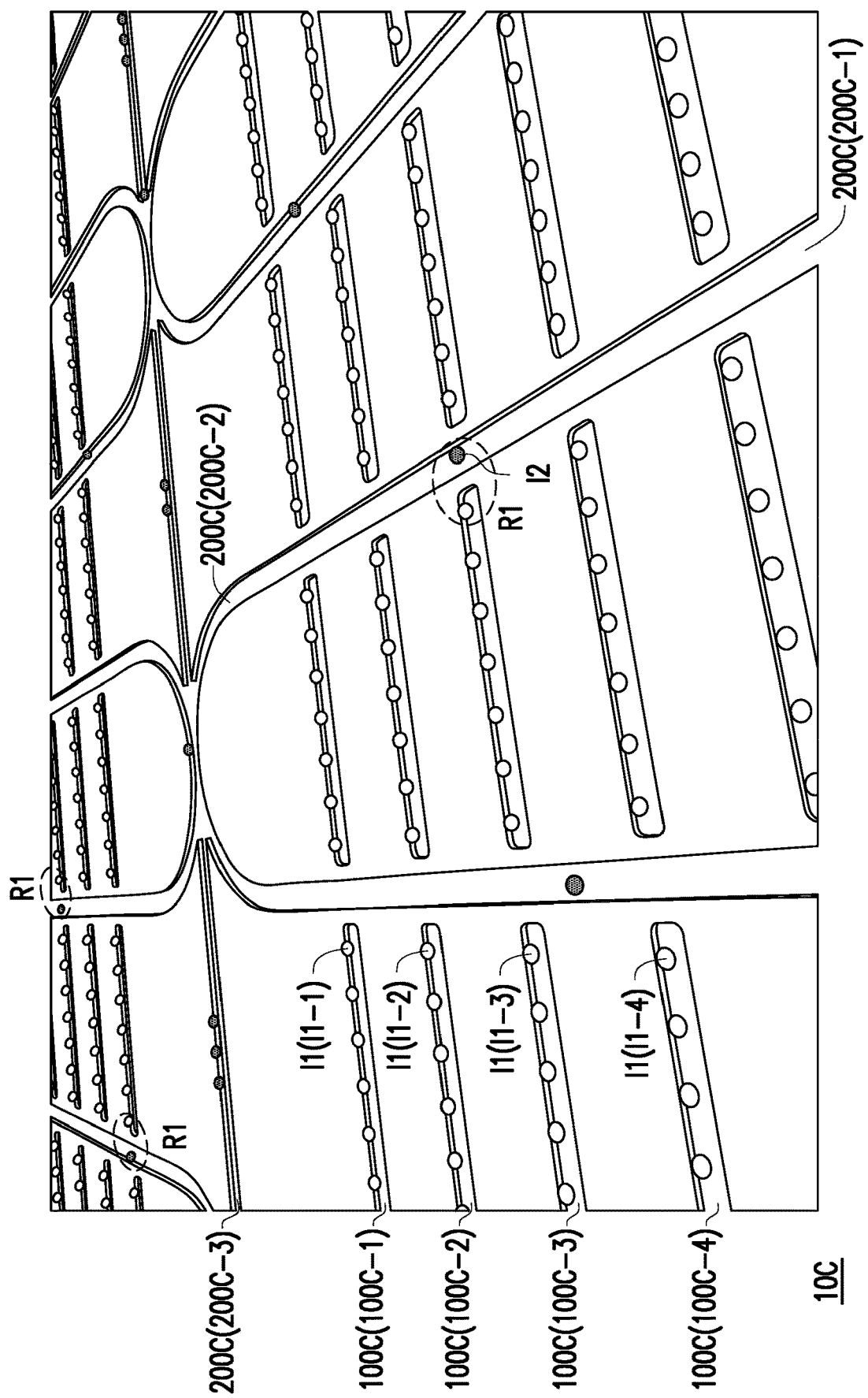
FIG. 6 is a schematic diagram of a quantum charge-coupled device according to a fourth embodiment of the disclosure.

FIG. 6 is a schematic diagram of a quantum charge-coupled device according to a fourth embodiment of the disclosure. Referring to FIG. 6, a quantum charge-coupled device 10C of FIG. 6 is substantially similar to the quantum charge-coupled device 10B of FIG. 5, and the main differences are as follows. In the embodiment, sub-fixed ion traps 100C-1, 100C-2, 100C-3, and 100C-4 of a fixed ion trap 100C are fixed linear ion traps or ion trap arrays, and an adjustable ion trap 200C includes multiple sub-adjustable ion traps 200C-1, 200C-2, and 200C-3. The sub-fixed ion traps 100C-1, 100C-2, 100C-3, and 100C-4 are configured to stationarily trap the sub-ions I1-1, I1-2, I1-3, and I1-4, respectively. The sub-adjustable ion traps 200C-1, 200C-2, and 200C-3 include linear rails (e.g., the sub-adjustable ion traps 200C-1 and 200C-3) and curved rails (e.g., the sub-adjustable ion trap 200C-2). When the second ion I2 moves along the adjustable ion trap 200C, the moving rail of the second ion I2 may be controlled through the adjustable ion trap 200C, for example, switching from moving on the sub-adjustable ion trap 200C-1 to moving on the sub-adjustable ion trap 200C-2 and then switching to moving on the sub-adjustable ion trap 200C-3. The second ion I2 may also complete state reset, re-cooling, and appropriate acceleration to a fixed speed during the switching process. The advantages of the quantum charge-coupled device 10C are similar to the advantages of the quantum charge-coupled device 10B in FIG. 5, so details are not described herein again.

In summary, in the quantum charge-coupled device of an embodiment of the disclosure, the second ion is arranged to move at a constant velocity along the ion rail formed by the adjustable ion trap. During the process of the second ion approaching the first ion, the adjustable ion trap keeps the second ion moving at a constant velocity, and does not need to move the second ion specifically with acceleration or deceleration. Therefore, this design eliminates a large number of steps for controlling and cooling the second ion, thereby saving a significant amount of operating power and reducing the system complexity. Furthermore, this architecture can be easily extended to a large-scale quantum computing platform.

What is claimed is:

1. A quantum charge-coupled device, comprising:
   a first ion;
   a second ion;
   a fixed ion trap, configured to stationarily trap the first ion;
   an adjustable ion trap, working as an ion rail disposed beside the fixed ion trap and configured to make the second ion move at a constant velocity along the ion rail; and
   an excitation light source, configured to irradiate an incident light beam, wherein the incident light beam comprises a series of light pulses and covers the first ion and the second ion when a distance between them becomes less than or equal to a proximity range, such that a quantum entangled state is directly built between the first ion and the second ion in uniform motion.

2. The quantum charge-coupled device according to claim 1, wherein the adjustable ion trap is a linear rail.

3. The quantum charge-coupled device according to claim 1, wherein the proximity range falls within a range of 10 micrometers to 20 micrometers.

4. The quantum charge-coupled device according to claim 1, wherein the incident light beam is irradiated toward a position of the adjustable ion trap when the second ion is passing by the first ion.

5. The quantum charge-coupled device according to claim 1, further comprising:
   an beam splitter, disposed between the excitation light source and the fixed ion trap or disposed between the excitation light source and the adjustable ion trap, wherein the beam splitter divides the incident light beam into a first incident light beam and a second incident light beam, the first incident light beam is irradiated toward the first ion, and the second incident light beam is irradiated toward a position of the adjustable ion trap that is closest to the first ion.

6. The quantum charge-coupled device according to claim 1, wherein the excitation light source comprises:
   a first sub-excitation light source, configured to emit a first incident light beam toward the first ion; and
   a second sub-excitation light source, configured to emit a second incident light beam toward a position of the adjustable ion trap that is closest to the first ion,
   wherein the first incident light beam and the second incident light beam are phase-locked.

7. The quantum charge-coupled device according to claim 6, wherein the excitation light source is a resonant short-pulsed laser.

8. The quantum charge-coupled device according to claim 1, wherein the first ion comprises a plurality of sub-ions, the fixed ion trap comprises a plurality of sub-fixed ion traps, and the sub-fixed ion traps stationarily trap the sub-ions, respectively,
   wherein when a distance between each of the sub-ions and the second ion is less than or equal to the proximity range, the incident light beam is irradiated on each of the sub-ions and the second ion, enabling quantum logic operations to be realized between each of the sub-ions and the second ion.

9. The quantum charge-coupled device according to claim 8, wherein the sub-fixed ion traps are linear ion traps or ion trap arrays, and the adjustable ion trap is a linear rail.

10. The quantum charge-coupled device according to claim 8, wherein the sub-fixed ion traps are linear ion traps or ion trap arrays, and the adjustable ion trap is a circular rail.

11. The quantum charge-coupled device according to claim 8, wherein the sub-fixed ion traps are fixed linear ion traps or ion trap arrays, the adjustable ion trap comprises a plurality of sub-adjustable ion traps, and the sub-adjustable ion traps comprise linear rails and curved rails.

* * * * *